(12) United States Patent
McLeod

(10) Patent No.: US 10,602,738 B2
(45) Date of Patent: Mar. 31, 2020

(54) PORTABLE HUNTING SHACK

(71) Applicant: James A. McLeod, Vassar (CA)

(72) Inventor: James A. McLeod, Vassar (CA)

(*) Notice: Subject to any disclaimer, the term of this patent is extended or adjusted under 35 U.S.C. 154(b) by 0 days.

(21) Appl. No.: 15/995,730

(22) Filed: Jun. 1, 2018

(65) Prior Publication Data

US 2019/0364879 A1 Dec. 5, 2019

(51) Int. Cl.
*A01M 31/02* (2006.01)
*B62D 63/08* (2006.01)

(52) U.S. Cl.
CPC ........... *A01M 31/025* (2013.01); *B62D 63/08* (2013.01)

(58) Field of Classification Search
CPC .............................. A01M 31/025; A01M 31/02
See application file for complete search history.

(56) References Cited

U.S. PATENT DOCUMENTS

| | | | | |
|---|---|---|---|---|
| 5,295,555 A * | 3/1994 | Strange | ...................... | E06C 5/04 182/116 |
| 6,739,428 B1 * | 5/2004 | Holmes | ................. | A01M 31/02 182/127 |
| D519,647 S * | 4/2006 | Watson | ........................... | D25/62 |
| 7,194,842 B2 * | 3/2007 | Baird | ...................... | B66F 11/04 182/127 |
| 7,389,854 B1 * | 6/2008 | Johnson | .................... | B60R 9/00 182/127 |
| 8,376,083 B1 * | 2/2013 | Dawes | .................. | A01M 31/02 182/127 |
| 10,143,194 B2 * | 12/2018 | Rubey | .................... | A01M 31/02 |
| 2006/0260871 A1 * | 11/2006 | Davis | ........................ | E06C 5/02 182/127 |

FOREIGN PATENT DOCUMENTS

| | | | | |
|---|---|---|---|---|
| DE | 2709904 A1 * | 9/1978 | ................ | B60P 3/00 |
| DE | 3437848 A1 * | 4/1986 | ............ | A01M 31/02 |
| DE | 202016106437 U1 * | 11/2016 | ............ | A01M 31/02 |

* cited by examiner

*Primary Examiner* — Alvin C Chin-Shue
(74) *Attorney, Agent, or Firm* — Adrian D. Battison; Ade & Company Inc; Michael R. Williams

(57) ABSTRACT

A mobile hunting blind mounted on a trailer comprises a trailer frame having a pair of wheels on which is mounted a shack and a winch for deploying the shack to an operating position. A frame portion stands upwardly adjacent the forward end of the trailer frame and a base of the shack is supported at the top for pivotal movement about a horizontal axis transverse to the trailer fame such that, in the first storage position, one side wall of the shack is generally horizontal and lies on the trailer frame with the base standing generally upwardly from the trailer frame and such that in the second operating position the base extends generally horizontally from the top of the upstanding support frame position with the side walls extending upwardly from the base. A ladder supports the edge of the base remote from the axis from the trailer frame.

7 Claims, 5 Drawing Sheets

PORTABLE HUNTING SHACK

This invention relates to a mobile or portable hunting shack. More specifically, the present invention relates to a mobile hunting blind that is mounted on a trailer

BACKGROUND OF THE INVENTION

Hunting blinds and stands that are used by hunters are commonly made of wood or fabric materials and are often painted or otherwise camouflaged to blend with the surroundings to conceal the hunters from the game they are seeking. Some hunting blinds and stands require the hunter to assume an uncomfortable crouched sitting position, and then stand to shoot as the animal approaches the stand, while others have windows or flaps which pivot outwardly or upwardly in order to provide visibility or to aim the weapon at the game. This movement can be seen by the animals, and will often frighten them away, or at best limit the hunter's opportunity to bag the game.

There are a number of prior art patents directed specifically to hunting blinds, including both on ground and elevated structures.

A primary objective of the present invention is to provide a mobile hunting blind that can be towed behind a truck or ATV.

It is an objective of the invention to provide a mobile hunting blind that has a hand winch for pulling in or letting out the shack cable.

It is, therefore, an objective of the present invention to provide a mobile hunting blind that has a trailer, a winch, a shack, and a ladder.

It is another objective of the invention to provide a mobile hunting blind that can be elevated from the ground.

Another objective of the present invention is to provide a mobile hunting blind that is economical to manufacture and easy to implement.

SUMMARY OF THE INVENTION

According to a first aspect of the invention there is provided a mobile hunting stand comprising:

a trailer having a trailer frame mounted on ground wheels for movement across the ground, a hitch arm extending forwardly from the frame and a hitch coupling at a forward end of the hitch arm for coupling to a towing vehicle;

a shack structure having a base and upstanding side walls into which a user can enter to be hidden from the exterior so as to be supported by the base with the side walls around the user;

the base including a support frame for supporting the base of the shack structure;

the base being pivotal about a horizontal axis so that the shack structure is rotatable between a first storage position in which one side wall of the shack structure is generally horizontal and lies on the trailer frame with the base standing generally upwardly from the trailer frame and a second operating position in which the base extends generally horizontally with the side walls extending upwardly from the base.

Preferably the dimension of the shack are selected so that the base has a height which is less than a height of the side walls. In this way, when the horizontal axis is transverse to the trailer so that the side walls extend longitudinally of the trailer in the first storage position, the laid shack forms a low profile when the trailer is towed.

Preferably in this arrangement, the base faces forwardly along the trailer in the first storage position, to engage a prevailing wind when towed.

In order to raise the shack from the ground in the typical hunting position, the horizontal axis is preferably located at a top of an upstanding support frame at the front of the trailer such that the base is supported at the top of the upstanding frame and extends in horizontal orientation over the trailer frame in the operating position.

This is particularly effective where the height of the upstanding support frame portion from the trailer is equal to the length of the base from the axis to the trailer frame so that the side wall at the end of the base remote from the axis lies on and takes support from the horizontal trailer frame in the first storage position.

Preferably the base includes a lever portion which extends forwardly from the horizontal axis for moving the base between the first and second positions by a winch mounted on the trailer frame with a cable attached to an outer end of the lever portion.

In order to support the base in the operating position there is provided a ladder which extends from the base to the trailer frame at a position spaced from the axis for supporting the base against pivotal movement to the first position. The ladder thus forms the dual function of allowing the user to climb into the shack and also of holding the shack simply in the operating position without the necessity for additional bracing.

Preferably the ladder is pivotally connected to the trailer frame and is movable in the first storage position to a storage location lying along the trailer frame. In this way the structure can simply fold or collapse into a low profile stored position on the trailer for transport and can be immediately and easily erected at a required location by operating the winch to raise the shack to the upright position and by moving the ladder to act as a brace.

According to a second aspect of the invention there is provided a mobile hunting stand comprising:

a trailer having a generally horizontal trailer frame mounted on ground wheels for movement across the ground, a hitch arm extending forwardly from the trailer frame and a hitch coupling at a forward end of the hitch arm for coupling to a towing vehicle;

a shack structure having a base and upstanding side walls into which a user can enter to be hidden from the exterior so as to be supported by the base with the side walls around the user;

the base including a support frame for supporting the base of the shack structure;

an upstanding support frame portion standing upwardly from the trailer frame adjacent one end of the trailer frame;

the base being supported at the top of the upstanding frame portion for pivotal movement about a horizontal axis transverse to the trailer fame;

wherein a height of the upstanding support frame portion from the trailer is equal to the length of the base from the axis to the trailer frame;

wherein the shack structure is rotatable between a first storage position for transport and a second operating position;

wherein in the first storage position one side wall of the shack structure remote from the axis is generally horizontal and lies on the trailer frame with the base standing generally upwardly from the trailer frame;

and wherein in the second operating position the base extends generally horizontally from the top of the upstanding support frame position with the side walls extending upwardly from the base;

and a ladder which in the second position extends from the base to the trailer frame at a position spaced from the axis for supporting the base against pivotal movement to the first position.

BRIEF DESCRIPTION OF THE DRAWINGS

One embodiment of the invention will now be described in conjunction with the accompanying drawings in which.

In the drawings like characters of reference indicate corresponding parts in the different figures.

DETAILED DESCRIPTION

Figure 1:
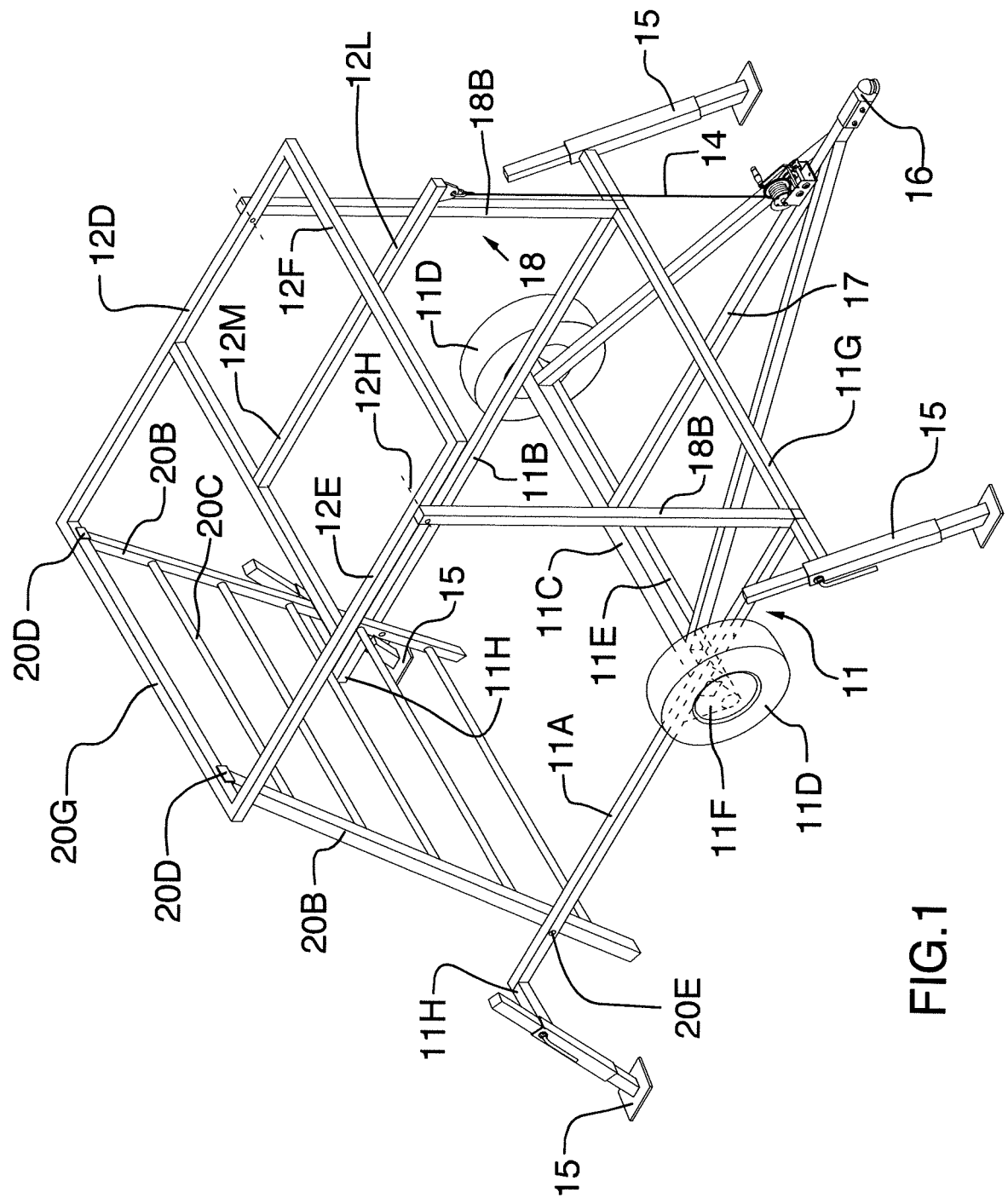
FIG. 1 is an isometric view of a frame for the mobile hunting stand according to the present invention with the shack portion omitted to show the frame structure.

The present invention is directed to a mobile and adjustable elevated hunting stand 10 that may be readily transported and erected at a selected location. The present invention is mounted on a trailer 11, and the trailer is typically of the order of 9 feet long and 4 feet wide. There is a shack 12 for covering and protecting the hunter while hunting. The shack is operated with a hand winch 13 by a cable 14 for elevating and lowering the shack. Whenever hunters want, they can roll the winch for elevating the shack and reverse roll for pushing down the shack.

Retractable stabilizer jacks 15 are included on the trailer to stabilize or position the trailer in an elevated position when in use. The jacks can be retracted during transport in conventional manner. It is portable so hunters can take it anywhere. There is a ball hitch coupler 16 mounted on the front of a hitch arm 17 connected to the trailer frame for attaching the trailer to the truck or ATV.

The trailer frame includes longitudinal side rails 11A and 11B connected by transverse rails 11C and 11G with the latter at the forward edge of the side rails and the former part way along the side rails. Each side rail terminates at a rear end 11H at which the respective rear jack 15 is located. The front jacks 15 are attached at ends of the cross rail 11G so as to be supported beyond the side rails for greater stability. The frame is carried on ground wheels 11D carried on an axle 11E and connected to the frame by conventional suspension systems 11F.

The mobile hunting stand thus includes the trailer having a trailer frame 11 mounted on ground wheels 11D for movement across the ground, the hitch arm 17 extending forwardly from the frame and the hitch coupling 16 at a forward end of the hitch arm for coupling to a towing vehicle.

The shack structure 12 has a base 12A and upstanding side walls 12B into which a user can enter through a door 12C at the rear wall to be hidden from the exterior so as to be supported by the base 12A with the side walls around the user. The base 12A includes a support frame for supporting the base of the shack structure with two sire rails 12D and 12E and cross rails 12F and 12G.

Figure 2:
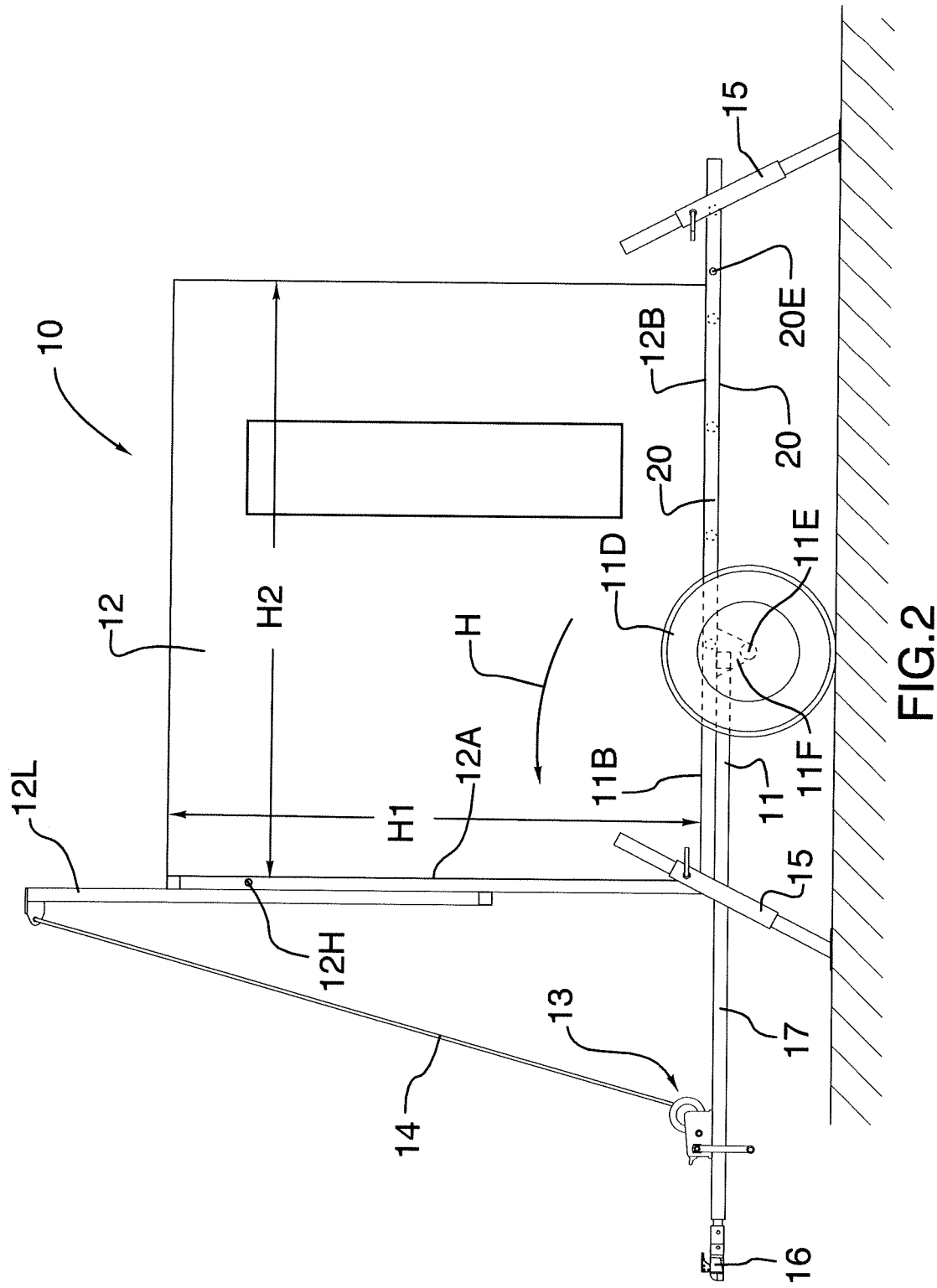
FIG. 2 is a side elevational view of the stand of FIG. 1 with the shack included and shown in the first storage or transport position.
Figure 3:
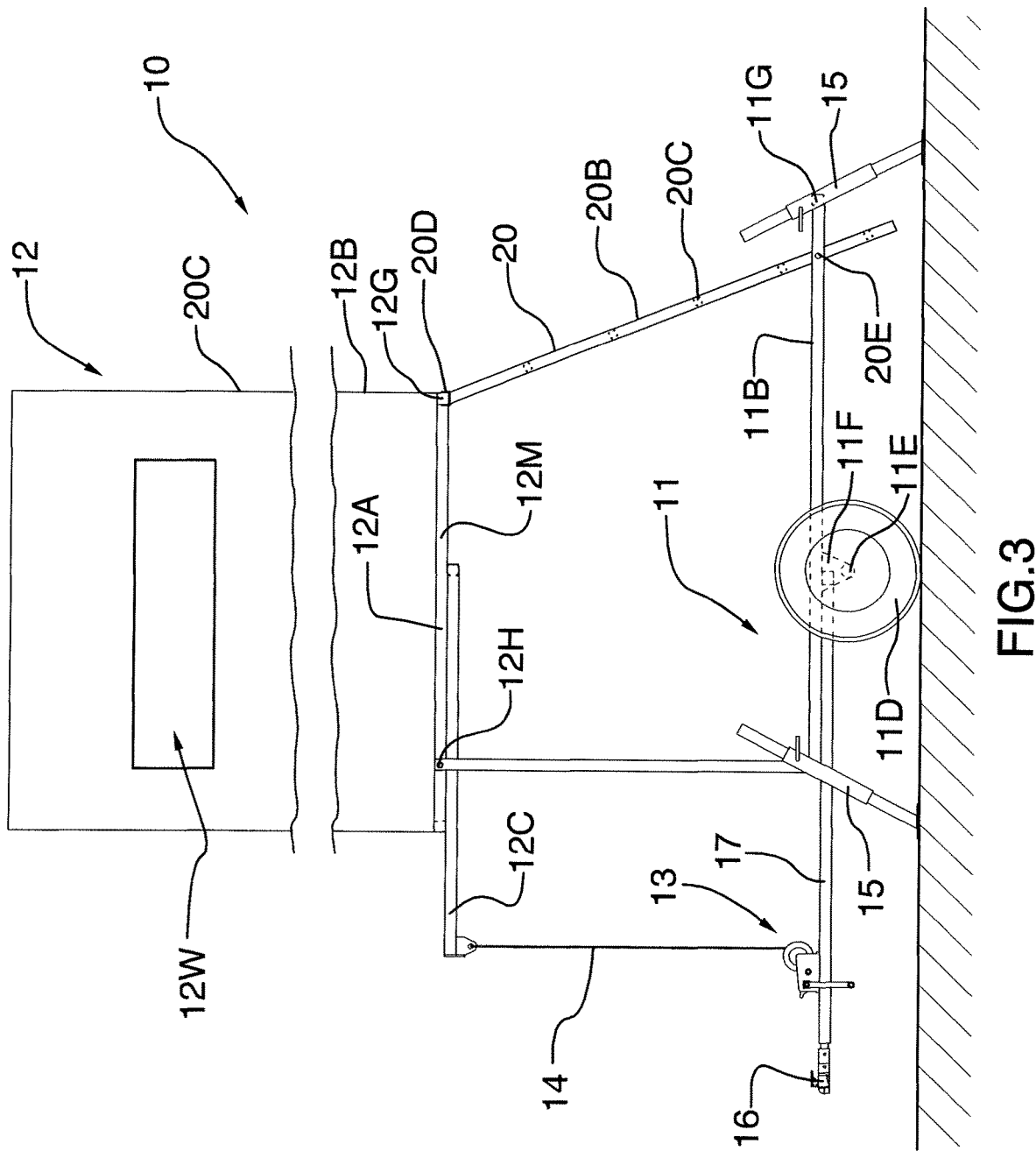
FIG. 3 is a side elevational view of the stand of FIG. 1 with the shack included and shown in the deployed or operating position.
Figure 4:
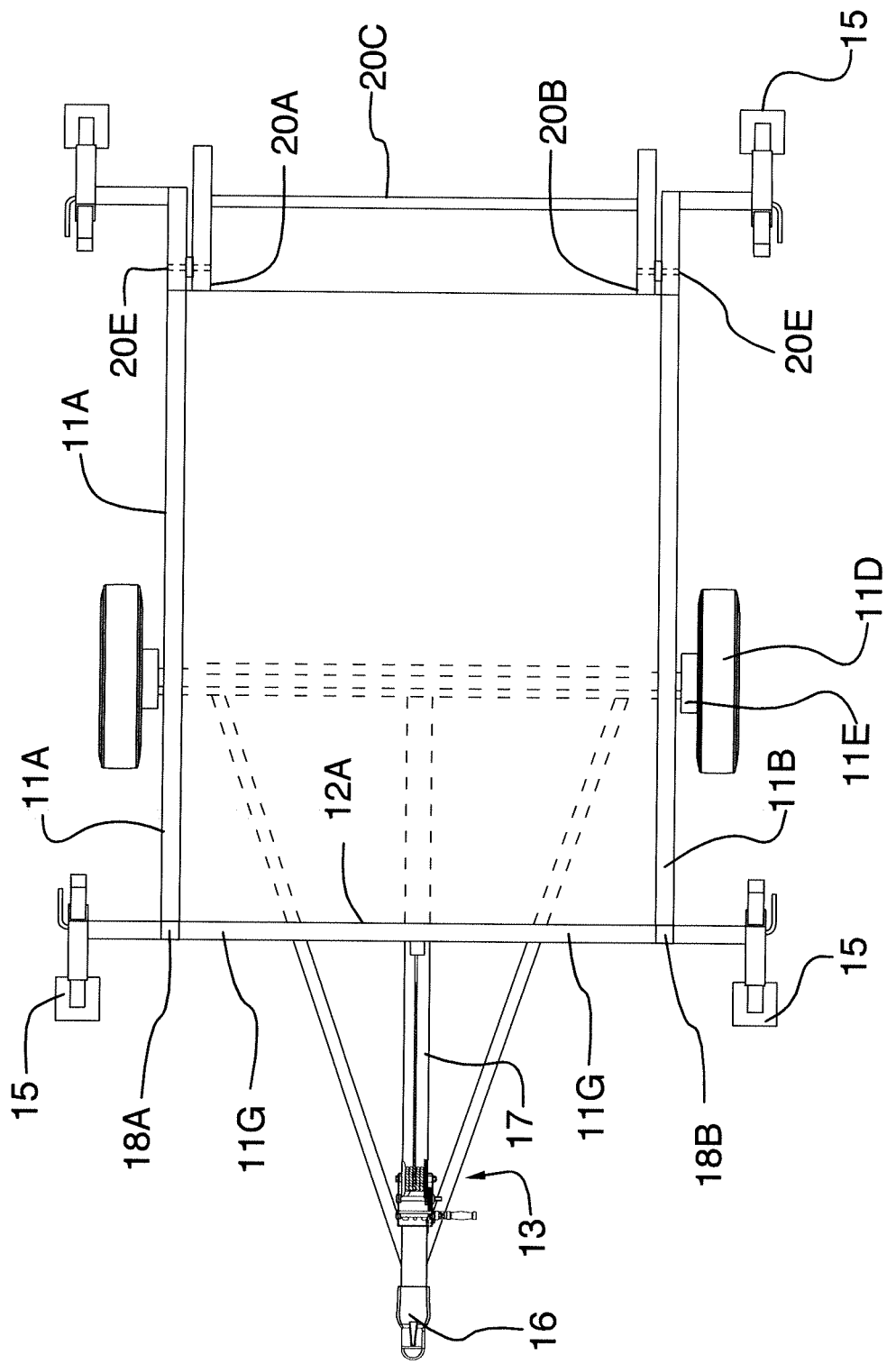
FIG. 4 is a top plan view of the stand of FIG. 1 with the shack included and shown in the deployed or operating position.
Figure 5:
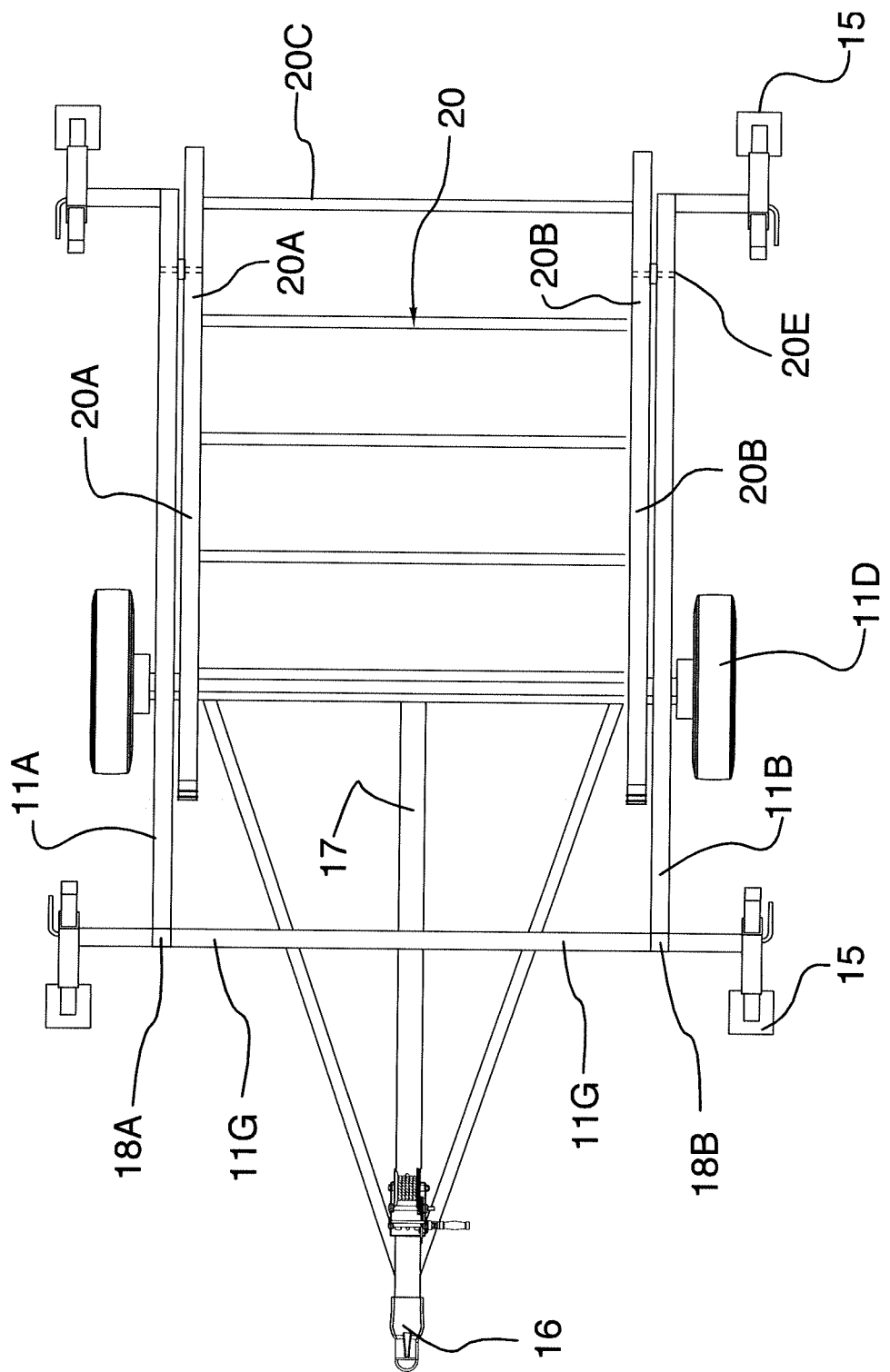
FIG. 5 is a top plan view of the stand of FIG. 1 with the shack omitted and shown in the first storage or transport position.

The base 12A is pivotal about a horizontal axis 12H so that the shack structure is rotatable between a first storage position shown in FIGS. 2 and 4 in which the rear side wall 12B of the shack structure is generally horizontal and lies on the trailer frame 11 with the base 12A standing generally upwardly from the trailer frame and a second operating position shown in FIGS. 1, 3 and 5 in which the base 12A extends generally horizontally with the side walls 12B extending upwardly from the base 12A.

The horizontal axis 12H is located at the top of an upstanding support frame portion 18 defined by a pair of posts 18A and 18B located at the front of the trailer frame and fixed to the cross beam 11G so as to stand upwardly therefrom. The base is thus supported at the top of the upstanding frame portion 18 and the axis extends in horizontal orientation across the trailer frame. The base is at the front of the trailer in the transport position and the side walls 12B extend longitudinally of the trailer in the rearward direction in the first storage position.

As shown in FIG. 2, the base 12A has a height H1 in the first storage position which is less than a height H2 of the side walls 12B in the operating position to form a low profile when the trailer is towed where the base 12A faces forwardly along the trailer in the direction F in the first storage position to engage a prevailing wind when towed.

Also as shown in FIG. 2, the height of the upstanding support frame portion from the trailer to the axis 12H is equal to the length of the base 12A from the axis 12H to the trailer frame so that the side wall 12B at the end of the base remote from the axis including the door 12C lies flat along on the trailer frame in the first storage position to be fully supported thereby.

The base 12A includes a lever portion 12L formed by an end portion of an arm 12M connected to the base 12A which extends outwardly from the horizontal axis 12H for moving the base between the first and second positions. The lever portion 12L is operated by the winch 13 mounted on the trailer frame with the cable 14 attached to an outer end of the lever portion.

There is also provided a ladder 20 formed by side rails 20A and 20B and cross rungs 20C which is pivotally mounted on the trailer frame at transverse axis 10E and in the second position extends from the rear of the base 12A to the trailer frame 11 at a position spaced from the axis 12H for supporting the base 12A in its horizontal position against pivotal movement back to the first position. The ladder 20 is pivotally connected to the trailer frame at the axis 20E and is movable in the first storage position to a storage location shown in FIGS. 2 and 5 lying along the trailer frame in between the side rails 11A and 11B. A coupling 20D connects the upper end of the ladder to the rear end of the base frame in the operating position as shown in FIG. 3.

In the erected position shown in FIG. 3, the user can climb the ladder to stand on the base surrounded by the walls by entering the door. With door closed, the hunter is enclosed and can look out through window openings 12W. In the transport position the ladder 20 folds down to the trailer frame and the winch can be operated to pivot the shack down to the position shown in FIG. 2 with the rear side wall and door lying flat on the trailer frame and the ladder contained underneath the door. The weight of the shack keeps it stably in place during transport. The shack can be readily and easily erected due to the lever action of the arm 12L using the winch 13 and then braced into place by manually lifting the ladder.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A mobile hunting stand comprising:
    a trailer having a trailer frame mounted on ground wheels for movement across the ground, a hitch arm extending forwardly from the frame and a hitch coupling at a forward end of the hitch arm for coupling to a towing vehicle;
    a shack structure having a base and upstanding side walls into which a user can enter to be hidden from the exterior so as to be supported by the base with the side walls around the user;
    the base of the shack structure being pivotal about a horizontal axis transverse to the trailer so that the shack structure is rotatable between a first storage position in which one side wall of the shack structure is generally horizontal and lies on the trailer frame with the base standing generally upwardly from the trailer frame and a second operating position in which the base extends generally horizontally with the side walls extending upwardly from the base;
    wherein the horizontal axis is located at a top of an upstanding support frame portion such that the base is supported at the top of the upstanding frame portion and extends in horizontal orientation over the trailer frame in the second operating position
    wherein the horizontal axis is arranged at a position part way across the base of the shack with a smaller portion of the base on a first side of the horizontal axis and a larger portion of the base on a second side of the horizontal axis;
    and wherein the base includes a lever member which extends outwardly from the horizontal axis to the first side of the horizontal axis and outwardly beyond the smaller portion;
    and a winch mounted on the trailer frame with a cable extending from a point on the trailer to a point at or adjacent an outer end of the lever member so as to pull on the lever member to cause rotation of the lever member around the horizontal axis to move the shack structure between the first storage position and the second operating position.

2. The mobile hunting stand according to claim 1 wherein the base has a height in the first storage position which is less than a height of the side walls in the operating position to form a low profile when the trailer is towed.

3. The mobile hunting stand according to claim 1 wherein the base faces forwardly along the trailer in the first storage position to engage a prevailing wind when towed.

4. The mobile hunting stand according to claim 1 wherein the upstanding frame portion is at the front of the trailer frame.

5. The mobile hunting stand according to claim 1 wherein a height of the upstanding support frame portion from the trailer is equal to a length of the base from the axis to the trailer frame so that the side wall at an end of the base remote from the axis lies on the trailer frame in the first storage position.

6. The mobile hunting stand according to claim 1 wherein there is provided a ladder which in the second operating position extends from the base to the trailer frame at a position spaced from the axis for supporting the base against pivotal movement to the first storage position.

7. The mobile hunting stand according to claim 6 wherein the ladder is pivotally connected to the trailer frame and is movable in the first storage position to a storage location lying along the trailer frame.

\* \* \* \* \*